(12) United States Patent
Mossberg et al.

(10) Patent No.: US 6,314,220 B1
(45) Date of Patent: Nov. 6, 2001

(54) SEGMENTED COMPLEX FIBER GRATINGS

(75) Inventors: Thomas Mossberg, Eugene, OR (US);
Michael Munroe, Petaluma, CA (US);
Anders Grunnet-Jepsen, Milpitas, CA (US); John Sweetser, San Jose, CA (US)

(73) Assignee: Templex Technology, Inc., San Jose, CA (US)

( * ) Notice: Subject to any disclaimer, the term of this patent is extended or adjusted under 35 U.S.C. 154(b) by 0 days.

(21) Appl. No.: 09/120,959

(22) Filed: Jul. 22, 1998

Related U.S. Application Data

(63) Continuation-in-part of application No. 09/100,592, filed on Jun. 19, 1998, which is a continuation-in-part of application No. 08/897,814, filed on Jul. 21, 1997, now Pat. No. 5,812,318, which is a continuation of application No. 08/403,376, filed on Mar. 13, 1995, now abandoned.

(60) Provisional application No. 60/082,989, filed on Apr. 24, 1998, provisional application No. 60/090,088, filed on Feb. 6, 1998, and provisional application No. 60/070,684, filed on Jan. 7, 1998.

(51) Int. Cl.$^7$ ............... G02B 6/34; G02B 6/28; G02B 5/18; G02B 27/42; H04J 14/02

(52) U.S. Cl. ............... 385/37; 385/24; 359/569; 359/573; 359/575; 359/566; 359/558; 359/130

(58) Field of Search ............... 359/565, 569, 359/559, 573, 575, 576, 124, 127; 385/16, 37, 24

(56) References Cited

U.S. PATENT DOCUMENTS

| 3,814,498 | * | 6/1974 | Tomlinson et al. ............... 359/569 |
| 4,474,427 | | 10/1984 | Hill et al. . |
| 4,725,110 | | 2/1988 | Glenn et al. ............... 359/575 |
| 5,367,588 | | 11/1994 | Hill et al. ............... 385/37 |
| 5,377,288 | | 12/1994 | Kashyap et al. ............... 385/37 |
| 5,388,173 | | 2/1995 | Glenn ............... 385/37 |
| 5,457,760 | * | 10/1995 | Mizrahi ............... 385/37 |
| 5,668,901 | | 9/1997 | Keck et al. ............... 385/37 |
| 5,718,738 | | 2/1998 | Kohnke et al. ............... 65/31 |
| 5,726,785 | | 3/1998 | Chawki et al. . |
| 5,748,350 | | 5/1998 | Pan et al. . |
| 5,748,814 | | 5/1998 | Painchaud et al. . |
| 5,764,829 | | 6/1998 | Judkins et al. ............... 385/37 |
| 5,812,318 | | 9/1998 | Babbitt et al. . |
| 5,815,307 | * | 9/1998 | Arbore et al. ............... 385/37 |
| 5,832,148 | * | 11/1998 | Yariv ............... 385/16 |

* cited by examiner

*Primary Examiner*—Audrey Chang
(74) *Attorney, Agent, or Firm*—Klarquist Sparkman, LLP

(57) ABSTRACT

A waveguide that is operative to produce a reflected optical signal having a spectral profile corresponding to a product of a spectral profile of an input optical signal and a predetermined complex-valued spectral filtering function wherein the waveguide includes a plurality of spatially distinct subgratings each possessing a periodic array of diffraction elements. The subgratings are situated and configured based on the predetermined complex-valued spectral filtering function.

2 Claims, 3 Drawing Sheets

SEGMENTED COMPLEX FIBER GRATINGS

RELATED APPLICATIONS

The present invention is (1) a continuation in part of provisional application 60/090,088, filed Feb. 6, 1998, entitled "Segmented Complex Fiber Gratings" which is now pending, (2) a continuation in part of the provisional application 60/070,684 filed Jan. 7, 1998 entitled "Temporal Waveform Processing of Optical Pulses with Thin Complex Profile Gratings" which is now pending, (3) a continuation in part of provisional application 60/082,989 filed Apr. 24, 1998 entitled "Segmented TASM Gratings" which is now pending, (4) a continuation in part of application 09/100,592 filed Jun. 19, 1998 still pending entitled "Segmented Complex Diffraction Gratings" which is now pending, (5) a continuation in part of application 08/897,814 filed Jul. 21, 1997, now U.S. Pat. No. 5,812,318 entitled "Apparatus and Methods for Routing Optical Beams Via Time-Domain Spatial-Spectral Filtering" which is now pending and which is a continuation of application 08/403,376 which was filed Mar. 13, 1995 and which is now abandoned.

FIELD OF THE INVENTION

The present invention relates to complex fiber Bragg gratings and more particularly to the use of complex fiber gratings for spectral filtering, and for the use of complex fiber gratings in optical communication systems.

BACKGROUND OF THE INVENTION

Optical fiber Bragg gratings are important elements for selectively transmitting or reflecting specific wavelengths of light within an optical fiber. A fiber Bragg grating comprises a length of optical fiber containing a refractive index profile that varies periodically along the length of the fiber. Refractive index variations with a single period, $\Lambda$, selectively reflect light with a wavelength of $\lambda=2\Lambda$. Other wavelengths are transmitted essentially unimpeded. Alternatively, $\Lambda$ can be chosen to vary along the length of the fiber in order to reflect a broad range of wavelength, e.g. chirped gratings. Such broadband gratings can for example be used for dispersion compensation to provide a wavelength dependent time delay to a propagating signal with a finite bandwidth. Another class of fiber gratings comprises the long-period-gratings in which the periodic spacing is at least 10 times larger than the transmitted wavelength, i.e. $\Lambda > 10\lambda$. These gratings provide wavelength dependent losses by coupling optical power between co-propagating guided and non-guided modes. Long-period gratings remove selected wavelengths from the guided mode into the non-guided mode and consequently spectrally shape the transmitted beam (U.S. Pat. No. 5,764,829) while causing little back-reflection in the fiber. Fiber gratings in general have numerous applications in the areas of optical sensing, signal processing, spectral filtering, and optical communications.

Simple periodic fiber gratings are known in the art, and many different methods have been described for impressing refractive index gratings in the core of photosensitive (e.g. germanium-doped) optical fibers (U.S. Pat. No. 4,474,427) including holographic techniques (U.S. Pat. No. 4,725,110), phase mask techniques (U.S. Pat. No. 5,367,588) and internally-reflecting prisms (U.S. Pat. No. 5,377,288). In addition, methods have been described for producing chirped fiber Bragg gratings (U.S. Pat. No. 5,718,738), fiber gratings possessing a continuous sinc function envelope on a periodic index of refraction modulation (U.S. Pat. No. 5,668,901), and methods for impressing an aperiodic grating on an optical fiber (U.S. Pat. No. 5,388,173).

Many present optical communication systems utilize diffraction gratings to enhance their performance. Fiber gratings are for example advantageous in wavelength division multiplexing (WDM) systems in which fiber Bragg gratings can provide high reflectivity and high wavelength selectivity with the aim of increasing the transmission capacity of optical fibers. Co-pending patent applications Ser. Nos. 08/403,376 and 60/070,684, and 08/897,814 which are referenced above describe a technology which relies on complex diffraction gratings for increasing the capacity of optical systems by utilizing a different type of multiplexing which can be termed optical code division multiple access (hereinafter OCDMA). OCDMA systems encode different communication channels with different temporal (time) codes as contrasted to the coding in WDM systems wherein different channels use different wave lengths of light.

Co-pending patent application Ser. No. 09/100,592 describes segmented surface diffraction gratings which consist of multiple subgratings, each subgrating having a specific amplitude, spatial phase, and spatial period. Such surface gratings can deflect optical pulses from a specific input direction to a specific output direction while simultaneously multiplying the Fourier spectrum of the input pulse by a predetermined filtering function. The output signals are a cross-correlation between the input waveform and the grating encoded temporal waveform. The gratings described in the referenced co-pending applications have a complex profile. They can accept input beams and generate spectrally filtered output beams propagating in one or more output directions. The filtering function of the device is programmed by choice of grating profile. By suitable programming, multiple transfer functions may be realized, each having its own specific input and output direction.

The present invention relates to fiber gratings with complex refractive index grating profiles, specifically segmented fiber gratings capable of providing programmed spectral filtering with high efficiency. The previous art does not encompass the segmented fiber gratings pursuant to the present invention. Another aspect of the present invention relates to methods for fabricating segmented fiber gratings. In another aspect of the present invention, the complex fiber gratings are used in an OCDMA optical communication system.

SUMMARY OF THE PRESENT INVENTION

The present invention comprises a structure (i.e. a segmented fiber grating) providing a means of creating a spectrally filtered copy of input optical signals. Segmented fiber grating devices accept an input optical signal and generate a reflected signal whose spectrum is correspondent to that of the input optical signal multiplied by a fiber-grating-specified spectral filtering function. Fiber grating devices, comprised of one or more segmented fiber gratings after the present invention can be used, for example, in OCDMA data links to temporally code optical signals with specific codes such that multiple coded channels can simultaneously be transmitted through the same link and then be decoded into separate channels at the output of the system. The segmented fiber gratings of the present invention can also be utilized in any application area wherein the ability to effect programmable spectral filtering is utilized, such as dispersion compensation. The segmented fiber gratings fabricated in accordance with the present invention consist of a series of spatially distinct subgratings arrayed end to end. Each subgrating possesses a periodic array of diffractive structures (elements). The overall transfer function of the segmented fiber grating is determined by controlling (a) the spatial periodicity or frequency of each subgrating, (b) the amplitude of each subgrating, (c) the optical distance between the last diffraction element on each subgrating and the first diffraction element of the successive subgrating, and (d) the position and length of each subgrating on the segmented fiber grating.

BRIEF DESCRIPTION OF THE FIGURES

FIG. 1 is an overall diagram of a multiplexing/demultiplexing system utilizing the present invention.

FIG. 2 is a schematic diagram showing the input and the output directions along which light passes into and out of the segmented fiber grating.

DETAILED DESCRIPTION OF A PREFERRED EMBODIMENT

Figures 1, 2:
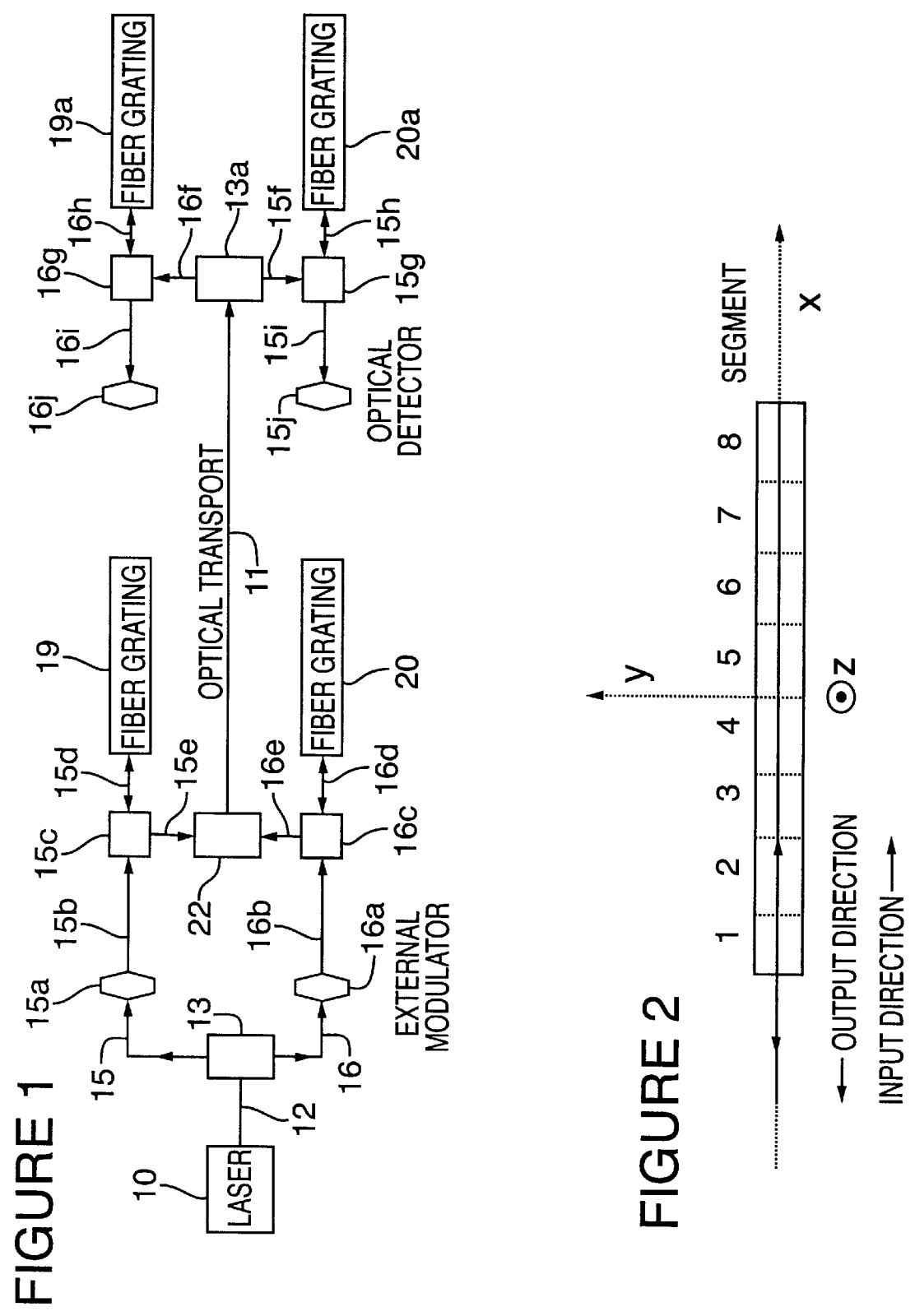
Figure 3:
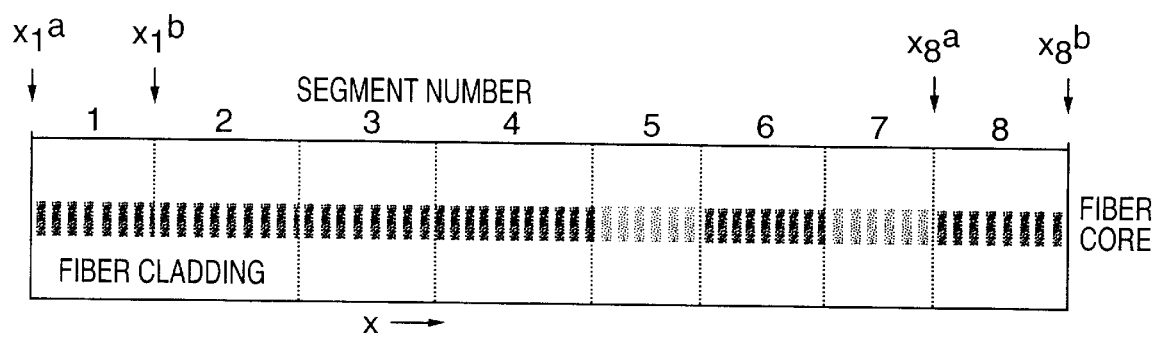
FIG. 3 shows a side view of a segmented fiber grating fabricated in accordance with the present invention.

FIG. 1 is an overall diagram of an OCDMA communication system which utilizes the segmented fiber diffraction gratings of the present invention to perform optical multiplexing and demultiplexing. While the optical beams in the preferred embodiment are assumed to propagate inside optical fiber, they may propagate in free space or any other means known in the art without departing from the scope of the present invention. Short-pulse laser 10 generates a coherent beam of light 12. Beam splitter 13 divides the light into two beams 15 and 16. Beams 15 and 16 are each individually modulated by modulators 15a and 16a respectively, thereby generating modulated beams 15b and 16b. The modulation of each of the beams is done in response to an external data stream not explicitly shown in FIG. 1. Beams 15b and 16b consist, either by virtue of the operative character of the laser source 10, the action of the modulators 15a and 16a, or a combination of the two, of a stream of bits whose temporal character matches the designed input pulses of fiber gratings 19 and 20.

Beams 15b and 16b consist of the optical input fields which are directed through optical circulators 15c and 16c along directions 15d and 16d into fiber gratings 19 and 20, respectively. Segmented fiber grating 19 and 20 generate output optical fields with time codes TC15 and TC16, respectively, that propagate along directions 15d and 16d in the opposite direction of the input optical fields. The output optical fields are separated from directions 15d and 16d at the optical circulators 15c and 15d into output beams 15e and 16e, respectively. While the input and output beams are separated by an optical circulator in this embodiment, any means known in the art may be used to separate the counterpropagating input and output beams (e.g. a beam splitter, etc.) without departing from the scope of this invention. Beams 15e and 16e are combined by a beam combiner 22 and output into optical transport 11. (The coding technique and the details of fiber gratings 19 and 20 are described below). The combined coded beam is transported to beam splitter 13a via optical transport device 11 which may for example be an optical fiber. Beam splitter 13a splits the combined beam into two equivalent beams 15f and 16f directed through optical circulators 15g and 16g at fiber gratings 19a and 20a along directions 15h and 16h, respectively. Segmented fiber gratings 19a and 20a operative on time codes TC15 and TC16 generate output optical fields that propagate along directions 15h and 16h in the opposite direction of the input optical fields, and are separated from directions 15h and 16h by optical circulators 15g and 16g producing output beams 15i and 16i, respectively. Beams 15i and 16i are modulated identically to the corresponding beam 15a and 16a, respectively. (The decoding technique and the details of gratings 19a and 20a are described below). The content of beams 15i and 16i is detected by detectors 15j and 16j and it is thus turned back into electrical signals which correspond to the signals that activated modulators 15a and 16a.

It is noted that while the embodiment shown herein combines two beams into one coded beam, three, four, or more beams could similarly be multiplexed into one beam using OCDMA coding, the combined coded beam can be transmitted over a transmission system and then the beams can be demultiplexed into the original signals.

Fiber gratings 19, 19a, 20, and 20a are designed to accept light from the input direction and to redirect the light into the output directions in a manner that is dependent on the temporal waveform of the input light. The fiber environment in which the grating is confined eliminates the need for precise control of input and output beam directions that characterizes many free space devices capable of providing programmed spectral filtering. The fiber environment enhances the efficiency with which input light energy is transferred to output light energy by eliminating competing output channels that exist in many free space devices including segmented surface gratings. Considering a specific input waveform, the fiber grating's functions can be summarized as follows: A portion of each spectral component of the input light field is mapped into the output direction with a controlled amplitude and phase. The fiber grating applies a designated complex valued spectral filtering to the input optical field and emits the filtered version of the input field in the output direction. The spectral resolution of the filtering function is determined by the physical size of the enabling segmented fiber grating.

FIG. 2 shows a segmented fiber grating fabricated in accordance with the present invention. We focus now on the design of a single segmented fiber grating. Fiber grating devices incorporating multiple segmented fiber gratings are designed through repetitive application of single segmented fiber grating procedures. The segmented fiber grating has N spatially distinct subgratings or sections 1 to N. In the embodiment shown N is equal to eight. An exemplary cross section of the segmented fiber grating is shown in FIG. 3. FIG. 3 is only presented for illustrative purposes to show that the diffractive structure on each of the subgratings comprising the segmented fiber grating has its own amplitude and phase. It is noted that in FIG. 3 the dark and light stripes indicates spatial regions of higher and lower values of optical refractive index with the understanding that for illustrative purposes only between six and nine diffractive elements are shown per subgrating although a true embodiment may contain substantially different numbers of elements.

In order to mathematically define the structure of the subgratings contained within one segmented fiber grating, it is first necessary to define a set of coordinates descriptive of the segmented fiber grating and associated optical input and output directions. For convenience, we chose the origin of the reference coordinate axes to lie in the center of the segmented fiber grating and the propagation axis of the fiber to coincide with the x-axis. We define the optical input direction to lie along $+\hat{x}$ and the optical output direction to lie along $-\hat{x}$. FIG. 2 shows a schematic diagram of a segmented fiber grating structure showing the input and output directions. Some light will be transmitted through the grating in direction along $+\hat{x}$. In the present embodiment this light is not utilized. However, the transmitted light is also spectrally encoded and the present invention extends to its use in suitably modified embodiments.

Fiber grating devices may require a single segmented fiber grating structure, multiple spatially superimposed segmented fiber grating structures, or a combination of spatially superimposed and spatially separated segmented fiber grating structures fabricated onto a single fiber or multiple fibers.

Fiber grating 15 is a reflective segmented fiber grating, but all particulars discussed herein can be transferred as known in the art to a transmissive fiber grating geometry. Furthermore, all of the particulars discussed herein can be transferred as known in the art to any waveguide geometry, be it semiconductor waveguides, rectangular glass waveguides, or fiber waveguides supportive of segmented gratings. It is noted that fiber grating 15 is arranged along the x-axis and the diffractive elements typically, but not necessarily span the core (and/or cladding) of the optical fiber in the y-z plane.

A single segmented fiber grating structure is fabricated in the form of a series of N spatially distinct subgratings arrayed end to end whose collective span defines the operative length of the segmented fiber grating. Each subgrating possesses a periodic array of diffractive elements arranged sequentially along the fiber axis (x-axis). The spacing between diffractive elements within the N successive spatial subgratings may not necessarily be the same. The N subgratings are written or otherwise created within the overall fiber grating such that each occupies a specific subsection of the overall fiber grating length and subgratings appear successively as one passes along the fiber axis. The optical path difference between the last diffractive element of each subgrating and the first diffractive element of the successive subgrating is controlled as will be described.

Control over diffractive element positioning provides control over relative spatial phase of adjacent subgratings. Also controlled is the amplitude and period of the diffractive elements within a given subgrating and the length and position of the given subgrating. The manner in which subgrating parameters is controlled determines the spectral transfer function of the fiber grating. Variation of optical path length between subgratings acts to control the relative phase of light transferred from the input to the output directions. Active devices can be added between the subgratings to dynamically change subgrating-subgrating separation to allow for the dynamical reprogramming of the spectral filtering function. Alternatively, active devices can be added between the subgratings to dynamically change the optical path length between subgratings through the introduction of refractive index changes in the regions between subgratings.

The representative segmented fiber grating shown in FIG. 3 has eight spatial subgratings. The representative segmented fiber grating is a reflective phase grating, but it could be a transmissive, amplitude, gain, or other generalized physical fiber grating type.

We represent the change in the index of refraction from the effective index of refraction of the fiber ($n_o$) versus position of one constituent subgrating, labeled by the subscript i, of a segmented fiber grating by the following mathematical expression $$h_i(x) = A_i f_i(2\pi(x-x_i)/\Lambda_i) \{\text{for } x_i^a \leq x \leq x_i^b\} \quad (1)$$

where x represents the spatial position coordinate along the fiber, $x_i$ is the spatial position shift of the $i^{th}$ subgrating index of refraction pattern, the function $f_i$ represents a particular index of refraction profile and is periodic in its argument on the scale of $2\pi$ and modulates between the values of 0 and 1, $A_i$ is a real-valued amplitude factor, $X_i^a$ and $x_i^b$ are the edge positions of subgrating i, and $\Lambda_i$ is the spatial period of the $i^{th}$ subgrating. Outside the prescribed spatial interval, $h_i(x)=0$. The subscript i ranges from 1 to N and denotes individual spatial subgratings. By specifying the parameters $A_i$, $x_i$, $x_i^a$, $x_i^b$, and $\Lambda_i$ for the subgratings employed, a wide range of spectral filtering functions can be encoded.

The parameters $A_i$, $x_i$, $x_i^a$, $x_i^b$, and $\Lambda_i$ necessary to produce specific spectral transfer functions can be chosen in a variety of ways. Assume that a fiber grating is to be constructed that provides a particular spectral transfer function $T(\nu)$ (where $\nu$ is the optical frequency) as approximated by N transmission coefficients each of which corresponds to one of N contiguous frequency channels collectively spanning the full non-zero width of $T(\nu)$. To accomplish this, the segmented fiber grating will require approximately N subgratings. We assume that $T(\nu)$ is nonzero over a specific spectral region of width $\delta\nu$ centered about the frequency $\nu_0$. To provide filtering with the specified resolution ($\delta\nu$), the subgratings will require a spatial length given approximately by $c/(n_o\delta\nu 2)$ where c is the speed of light and $n_o$ is the background effective refractive index of the fiber at center frequency $\nu_0$. The total length of the fiber grating will thus be approximately given by $Nc/(2 n_o\delta\nu)$ assuming that the subgratings are laid down contiguously ($x_i^a \cong x_{i-1}^b$).

For example, if $\delta\nu=100$ GHz, $n_o=1.5$, and N=8 the complete spatial length of a segmented fiber grating capable of representing $T(\nu)$ will be approximately 0.8 cm.

The parameters ($A_i$, $x_i$, $x_i^a$, $x_i^b$, and $\Lambda_i$) for all of the N subgratings comprising the segmented fiber grating determine its spectral transfer function. Given the subgrating parameters, the spectral transfer function of the segmented fiber grating can be determined. Conversely, given a specific spectral transfer function the subgrating parameters which must be employed to create a segmented fiber grating with that transfer function can be determined. It should be understood that while the mathematics presented herein contain certain constraining assumptions in order to facilitate an explanation of the preferred embodiment of the invention, the equations can be generalized without departing from the invention.

We first give an expression for the spectral transfer function exhibited by a segmented fiber grating in terms of subgrating parameters. Under the assumptions that 1) $A_i \ll 1$ and 2) the N subgratings have equal spatial length ($d=x_i^b - x_i^a$=constant) and are laid down contiguously ($x_i^a = x_{i-1}^b$), and equal spatial period ($\Lambda_i = \Lambda$=constant), the spectral transfer function of the segmented fiber grating may be written as a sum over subgrating parameters as follows:

$$T(v) = F(v) \sum_{i=1}^{N} a_i \exp(j\Phi_i) \quad (2a)$$

where:

$$a_i = A_i \exp(-j2\pi x_i/\Lambda), \quad (2b)$$

$$\Phi_i = \pi n_o (x_i^a + x_i^b)[\beta v - 1/(n_o\Lambda)], \quad (2c)$$

and $$\beta = 2/c. \quad (2d)$$

Here, $F(v)$ is the spatial Fourier transform of a subgrating given by $$F(v) = \frac{jC}{N} \text{sinc}(\pi n_o d[v\beta - 1/(n_o\Lambda)]), \quad (3)$$

where $j$ is $\sqrt{-1}$, and $C$ is a constant dependent on the index of refraction profile and contains a phase factor dependent on the choice of x-origin. The function sinc(x) is defined as equal to sin(x)/x. In writing Eqs. (2) and (3), it is assumed that the output signal is derived from the plus one diffractive order (m=1) of the subgratings. Analogous expressions for higher orders follow as per known in the art.

If one wishes to design a segmented fiber grating having a specific transfer function, it is necessary to determine appropriate parameters for each subgrating. To do this one first solves Eq. (2a) for $a_i$ and obtains $$a_i = \beta d n_o \int_{m/(\beta\Lambda n_o)-1/(2\beta d n_o)}^{m/(\beta\Lambda n_o)+1/(2\beta d n_o)} \frac{T(v)}{F(v)} \exp(-j\pi n_o [v\beta - 1/(n_o\Lambda)](x_i^a + x_i^b)) dv \quad (3)$$

From Eq. (2b) one finds that $A_i$ is equal to the amplitude of $a_i$. The quantity $x_i$ determines the phase of $a_i$ as seen in the equations above. The parameter $\Lambda$ is chosen so the light of carrier frequency $v_o$ is maximally diffracted using the generalized Bragg condition $\Lambda n_o = m\lambda_o/2$ where $\lambda_o = c/v_o$ is the center wavelength of the desired transfer function, and m is the diffractive order (m=1 in the embodiment discussed herein but alternative embodiments can utilize other diffractive orders).

For a segmented fiber grating to perform the function of optical cross-correlation between optical input waveforms and a reference optical waveform, the fiber grating's spectral transfer function should be the complex conjugate of the spectrum of the reference optical waveform. The function of optical cross-correlation here means that the electric field reflected by the fiber represents the temporal cross correlation between a) an input optical waveform and b) the specific reference optical waveform whose conjugated spectrum coincides with the fiber grating's spectral transfer function.

Figure 4:
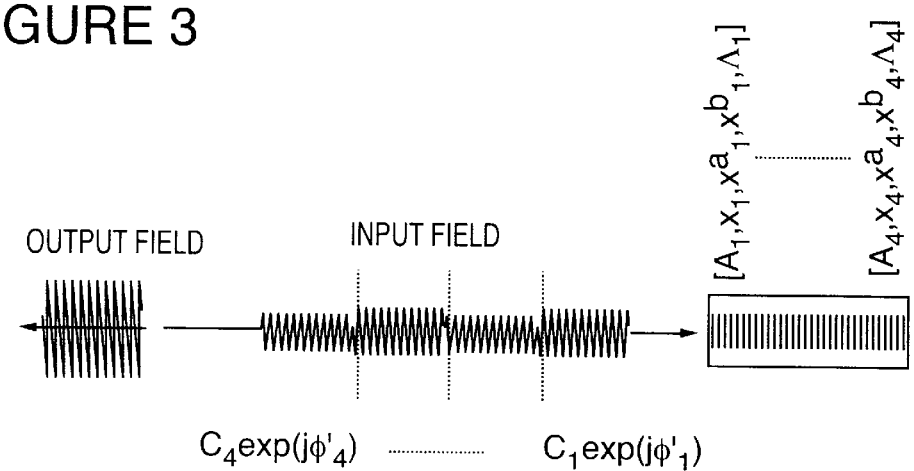
FIG. 4 shows a temporally coded optical pulse composed of 4 time slices that is incident on a segmented fiber grating of 4 contiguous equal length subgratings.

Consider a reference optical waveform whose time profile is represented as a sequence of N contiguous time slices within which the amplitude and phase of the optical field is constant. In time slice i (i=1, ... ,M), the electric field has constant amplitude $B_i$ and phase $\phi_i$. The reference waveform is thus determined by the set of complex numbers $[B_1 \exp(j\phi_1), B_2 \exp(j\phi_2), \ldots, B_M \exp(j\phi_M)]$ along with the optical carrier frequency in each time slice and the overall temporal duration of the waveform. FIG. 4 schematically illustrates an input optical waveform of the form $[C_1 \exp(j\phi'_1), C_2 \exp(j\phi'_2), \ldots, C_4 \exp(j\phi'_4)]$ incident on a segmented fiber grating.

When an optical waveform is incident on the fiber grating, the fiber grating will spectrally filter the incident waveform as described by the fiber grating spectral transfer function. If the fiber grating is to perform the function of cross-correlation against the reference optical waveform, the sub-gratings should have parameters that are the "time-reversed" complex conjugate of the reference optical waveform, e.g. $[\alpha_1, \alpha_2, \ldots \alpha_8] = [B_8 \exp(-j\phi_8), B_7 \exp(-j\phi_7), \ldots, B_1 \exp(-j\phi_1)]$ where the subgrating parameters are related to $\alpha_i$ by equation (2b) given the assumptions in deriving Eqs. (2a–3) are met. The operation of cross-correlation may be used to multiplex and demultiplex optical signals according to the OCDMA scheme.

It is noted that the refractive index profile (functional form of $f_i(x)$ in Eq. (1)) affects primarily the diffraction efficiency of the fiber grating if the approximations used to derive Eqs (2–3) are met. This affects the magnitude of the spectral transfer function or the constant C in Eq. (3).

The following specifies the fiber gratings employed in an exemplary two-channel multiplex/demultiplex system as in FIG. 1. Fiber gratings 19, 19a, 20 and 20a used are each composed of a segmented fiber grating. Fiber gratings 19 and 20 accept uncoded data streams and launches time-coded data into its output direction. Fiber gratings 19a and 20a accept time-coded data and launches distinct time codes into its output direction while simultaneously stripping off time-coding. Fiber gratings 19a and 20a functions through the process of cross-correlation.

In the multiplexer/demultiplexer embodiment presently considered we use sinusoidal refractive index profiles in fiber gratings 19, 19a, 20, and 20a with a fiber grating period of $\Lambda = 0.51$ μm. We assume uniform subgrating amplitudes of $A_i = 10^{-5}$, and $n_o = 1.5$ for all the segmented fiber gratings. The fiber gratings have eight contiguous ($x_i^a = x_{i-1}^b$) subgratings, each subgrating has a length of 1 mm, thus the total grating length is 8 mm. The segmented fiber gratings are designed for optical data streams having the carrier frequency 195 THz (a carrier wavelength $\lambda = 1.54$ μm).

The segmented fiber gratings 19 and 20 of this embodiment are designed to accept temporally short input pulses of optimal duration $\tau_p = 10$ ps and generates temporally coded pulses along the output direction. The filtering bandwidth of the segmented fiber gratings 19 and 20 is $\delta v \approx 1/\tau_p$ or 100 GHz.

For fiber grating 19 to produce output pulses of approximate duration $\tau_p = 80$ ps with the following time code TC15

[1, 1, 1, exp(j2π/3), exp(j4π/3), 1, exp(j4π/3), exp(j4π/3)]
the corresponding subgrating parameters $x_i$ for the segmented fiber grating are $[x_1, x_2, \ldots, x_8] = [0.0$ μm, $0.0$ μm, $0.0$ μm, $-0.17$ μm, $0.17$ μm, $0.0$ μm, $0.17$ μm, $0.17$ μm].

For fiber grating 20 to produce output pulses of approximate duration $\tau_p = 80$ ps with the following time code TC16

[exp(j4π/3), exp(j2π/3), 1, exp(j4π/3), exp(j2π/3), 1, exp(j4π/3), exp(j2π/3)]
the corresponding subgrating parameters $x_i$ for the segmented fiber grating are $[x_1, x_2, \ldots, x_8] = [0.17$ μm, $-0.17$ μm, $0.0$ μm, $0.17$ μm, $-0.17$ μm, $0.0$ μm, $0.17$ μm, $-0.17$ μm].

The multiplexed beams copropagating in optical transport 11 and split at beam splitter 13a may be demultiplexed at fiber gratings 19a and 20a. The demultiplexing fiber gratings 19a and 20a in FIG. 1 are identical in design to fiber gratings 19 and 20, respectively, but with the input and output direction on the opposite side of the fiber grating.

The reversal of the propagation direction into the fiber gratings is equivalent to changing $h_i(x)$ in Eq. (1) to $h_i(-x)$ resulting in coded fiber gratings 19a and 20a described below.

In order to produce output pulses of approximate duration $\tau_p=10$ ps given an input optical field with time code TC15,

[1, 1, 1, exp(j2π/3), exp(j4π/3), 1, exp(j4π/3), exp(j4π/3)], segmented fiber grating 19a, has subgrating parameters $x_i$ given by

[$x_1, x_2, \ldots, x_8$]=[0.17 μm, −0.17 μm, 0.0 μm, 0.17 μm, −0.17 μm, 0.0 μm, 0.0 μm, 0.0 μm].

In order to produce output pulses of approximate duration $\tau_p=10$ ps given an input optical field with the time code TC16,

[exp(j4π/3), exp(j2π/3), 1, exp(j4π/3), exp(j2π/3), 1, exp(j4π/3), exp(j2π/3)]

segmented fiber grating 20a has subgrating parameters $x_i$ given by

[$x_1, x_2, \ldots, x_8$]=[0.17 μm, −0.17 μm, 0.0 μm, 0.17 μm, −0.17 μm, 0.0 μm, 0.17 μm, −0.17 μm].

For the fiber grating specifications given above, the laser source 10 as shown in FIG. 1 must have a maximum temporal pulse width (FWHM) of 10 ps (given by the minimum $\tau_p$ of the two segmented fiber gratings).

Manufacturing Segmented Fiber Gratings:

Using lithography (optical or electron beam) refractive index profiles can be written onto a fiber point by point along the fiber axis. Thus segmented fiber gratings with spatial phase shifts between the subgratings can be written directly onto a fiber. Control of subgrating amplitude is also possible using this technique.

It is also possible to use a variety of holographic techniques to successively or simultaneously record subgratings with controlled refractive index profile properties.

Figure 5:
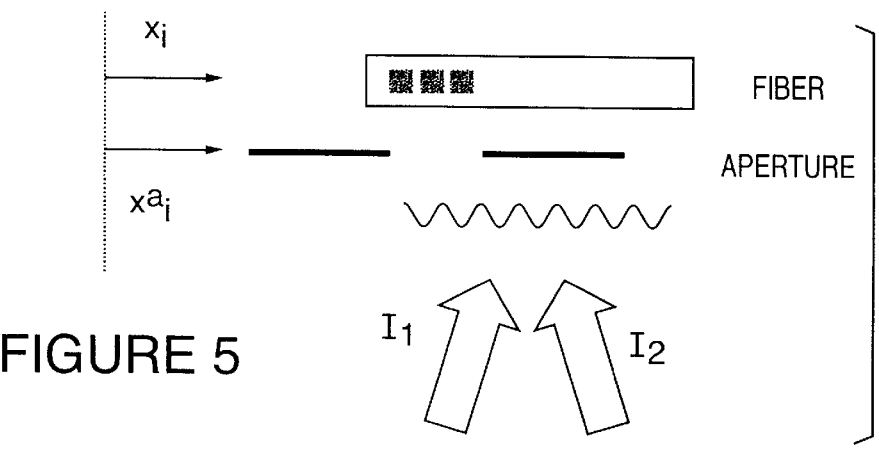
FIG. 5 shows a first technique for fabricating segmented fiber gratings according to the present invention.

FIG. 5 illustrates how the segmented fiber grating can be manufactured by spatial repositioning of the fiber to produce subgratings with controlled spatial phase. The angle between the two beams or the wavelength of the two beams used in standard holographic recording can be used to control the grating spacing $\Lambda_i$. Spatial phase shifts may be introduced between exposures by translating the fiber. Thus, the N subgratings can be recorded, as shown in FIG. 5, by spatially translating an aperture mask of width d=D/N (where D is the total grating length) by its width N times and exposing the recording material at each mask position. Between exposures, the fiber is shifted along the fiber axis. The fiber is shifted a distance $x_i$ relative to a fixed reference prior to exposure of subgrating i. Control of writing beam intensity between fiber exposures allows for subgrating amplitude $A_i$ control.

A similar method of producing segmented fiber gratings comprised of subgratings with spatial phase shifts uses single exposure holography with a phase-code mask having the appropriate subgrating phase shifts encoded in its optical thickness. The mask is placed in one of the two interfering beams in close proximity to the fiber.

Figure 6:
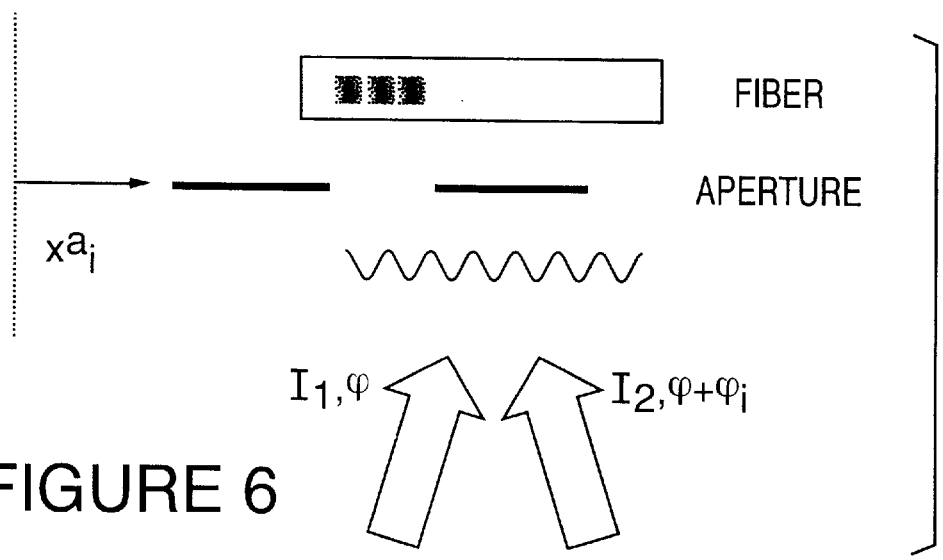
FIG. 6 shows a second technique for fabricating segmented fiber gratings according to the present invention.

FIG. 6 shows a holographic method for fabricating fiber gratings with N subgratings with controlled spatial phase shifts. This technique controls the phase-difference, $\phi_i$, between the two optical writing beams as shown in FIG. 6. Control of writing beam intensity allows for control of subgrating amplitude as well. The optical phase difference determines the position of the interference pattern on the fiber where the beams overlap, and their intensity controls the modulation amplitude of the interference pattern. The subgratings are recorded by illuminating the whole sample region with the interference pattern, but using an aperture of width d so that only the region behind the aperture is exposed and recorded. By spatially shifting the aperture across the sample in N steps it is possible to write a series of N subgratings, with each grating having a phase determined by the phase-difference $\phi_i$ used during exposure of the $i^{th}$ subgrating.

Figure 7:
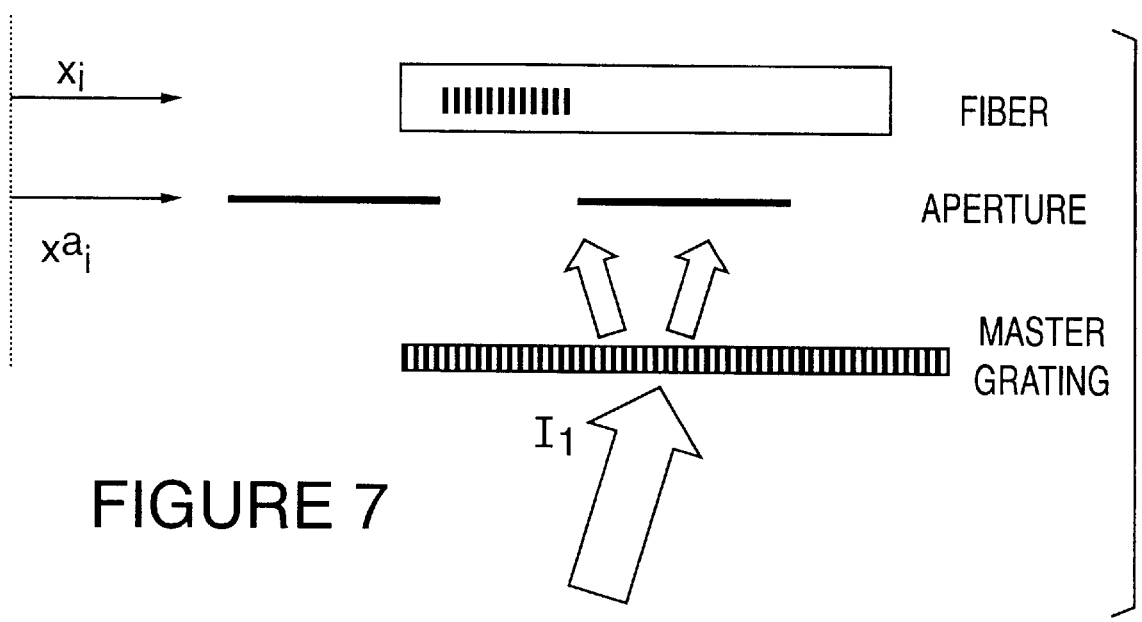
FIG. 7 shows a third technique for fabricating segmented fiber gratings according to the present invention.

FIG. 7 illustrates an approach to producing subgratings termed the "master phase mask" approach. In this approach a single writing beam is used in conjunction with a master phase mask diffraction grating. A single beam incident on a master grating will be diffracted to yield one or more extra output beams. The incident and diffracted beams will interfere producing an interference pattern that can be used to record a near duplicate of the master grating as known in the art. This property of diffraction gratings makes it possible to use a master grating to generate the interference pattern needed for the fiber grating. The phase in each subgrating is imparted by translating the master grating or the recording fiber between successive masked subgrating exposures.

Production of Segmented Fiber Gratings Through Fourier Synthesis:

A fiber grating may be made by a Fourier synthesis method by superposition of multiple periodic gratings each of which spans the entire length of the segmented fiber grating. The constituent periodic gratings have relative phases, amplitudes, and spatial periods such that when summed they result in the segmented fiber grating profile of interest. The constituent periodic gratings are the Fourier components of the desired fiber grating profile. The more Fourier components used the more sharply defined the subgratings will be.

The fiber gratings can be manufactured by holographic or lithographic methods. By exposing a photosensitive fiber with multiple holographic exposures each of which writes a particular constituent periodic grating, the desired fiber grating profile can be recorded. Lithographic means also provide for multipass writing wherein each pass is employed to write one constituent periodic grating.

Figure 8:
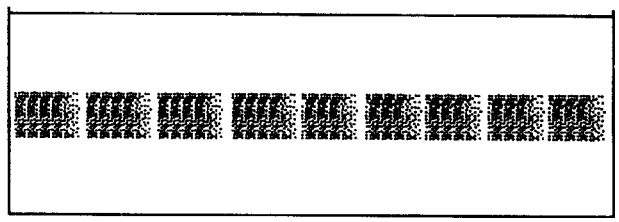
FIG. 8 shows a side view of two subgratings of a segmented fiber grating which have a saw tooth blaze. Note the light and dark stripes correspond to areas of higher and lower refractive index.

Fiber Gratings With Specific Refractive Index Profiles:

By using lithographic and holographic methods the fiber gratings may have an arbitrary refractive index modulation profile which include saw-tooth blazed, square wave, sine wave, etc. in order to engineer the diffraction efficiency. FIG. 8 is a schematic of a fiber grating similar to that shown in FIG. 3, but with a saw-tooth modulation profile.

It is noted that the descriptions of the segmented fiber gratings presented in this document can be generalized to include gain fiber gratings as well as absorption fiber gratings.

Dynamic Gratings:

In the embodiments described above, the fiber gratings have been static. The following describes an embodiment wherein the fiber gratings can be dynamically reprogrammed with respect to their spectral filtering functions.

In the previously described embodiments, the spectral transfer function of the gratings is determined by the parameters $A_i$, $x_i$, $x_i^a$, $x_i^b$, and $\Lambda_i$ of its constituent subgratings. Generally speaking, any means known in the art that provides for dynamic control of one or more of these parameters will enable dynamic reprogramming of gratings. A variety of construction methods allow for dynamic reconfiguration of gratings. For example: Control of $x_i$ and $\Lambda_i$ through control of fiber index of refraction or fiber length. A fiber grating created by the means described above may contain a material whose index of refraction can be controlled by any of the standard means known in the art including, for example, applied electric field, pressure, current, temperature, or optical irradiation. A fiber grating may also be created within a system that has spatially localized stretching or compressing of the fiber, thereby changing a combination of $x_i^a$, $x_i^b$, $x_i$, and $\Lambda_i$ in a way that is determined by the geometry of said system.

While the invention has been described with respect to preferred embodiments thereof, it will be understood by those skilled in the art that various changes in format and detail may be made without departing from the spirit and scope of the invention.

We claim:

1. A waveguide operative to produce a reflected optical signal having a spectral profile corresponding to a product of a spectral profile of an input optical signal and a predetermined complex-valued spectral filtering function, said waveguide comprising: a plurality of spatially distinct subgratings, each subgrating possessing a periodic array of diffraction elements, wherein the subgratings are situated and configured based on the predetermined complex-valued spectral filtering function, wherein each of said subgratings has an amplitude, spatial phase shift, beginning and ending position, and spatial period ($A_i$, $x_i$, $x_i^a$, $x_i^b$, and $\Lambda_i$, respectively), wherein the amplitude ($A_i$) and a phase ($-j2\pi x_i/\Lambda_i$) of each of said subgratings corresponds to a modulus and an argument, respectively, of a complex parameter $\alpha_i$, wherein $\alpha_i$ can be expressed as $$a_i = \beta d_i n_0 \int_{m_i/(\beta \Lambda_i n_0) - 1/(2\beta d_i n_0)}^{m_i/(\beta \Lambda_i n_0) + 1/(2\beta d_i n_0)} \frac{T(v)}{F_i(v)} \exp(-j\pi n_0 [v\beta - 1/(n_0 \Lambda_i)](x_i^a + x_i^b)) dv,$$

wherein $\upsilon$ is frequency, $n_0$ is average waveguide refractive index, $\beta=2/c$, c is the vacuum speed of light, $d_i = x_i^b - x_i^a$, $m_i$ is a diffraction order of an ith subgrating, $F_i(\upsilon) = (jC/N)\text{sinc}(\pi n_0 d_i[\upsilon\beta - 1/(n_0\Lambda_i)])$, C is a constant, N is a number of subgratings, $T(\upsilon)$ is a complex-valued spectral filtering function, and j is a square root of $-1$.

2. A waveguide, comprising a plurality of spatially distinct subgratings, each subgrating including a periodic array of diffraction elements, the subgratings being situated and configured to produce an output signal corresponding to a product of a predetermined complex-valued spectral transfer function and a spectral profile of an input optical signal received by the waveguide, wherein an ith subgrating has an amplitude, spatial phase shift, beginning and ending position, and spatial period ($A_i$, $x_i$, $x_i^a$, $x_i^b$, and $\Lambda_i$, respectively), wherein a complex amplitude ($\alpha_i$) of the subgrating corresponds to $$a_i = \beta d_i n_0 \int_{m_i/(\beta \Lambda_i n_0) - 1/(2\beta d_i n_0)}^{m_i/(\beta \Lambda_i n_0) + 1/(2\beta d_i n_0)} \frac{T(v)}{F_i(v)} \exp(-j\pi n_0 [v\beta - 1/(n_0 \Lambda_i)](x_i^a + x_i^b)) dv,$$

wherein $\upsilon$ is frequency, $A_i$ and $x_i$ are determined by the amplitude and phase of $\alpha_i$, respectively, $\alpha_i = A_i \exp(-j2\pi x_i/\Lambda_i)$, $\beta=2/c$, c is the vacuum speed of light, $d_i = x_i^b - x_i^a$, $m_i$ is a diffraction order of an ith subgrating, $F_i(\upsilon) = (jC/N)\text{sinc}(\pi n_0 d_i[\upsilon\beta - 1/(n_0\Lambda_i)])$, C is a constant, N is a number of subgratings, and $T(\upsilon)$ is the predetermined complex-valued spectral transfer function, j is a square root of $-1$, and $n_0$ is a background effective refractive index of the waveguide.

* * * * *